C. H. THURBER.
CHART.
APPLICATION FILED MAY 8, 1913.
1,087,336.
Patented Feb. 17, 1914.
2 SHEETS—SHEET 1.
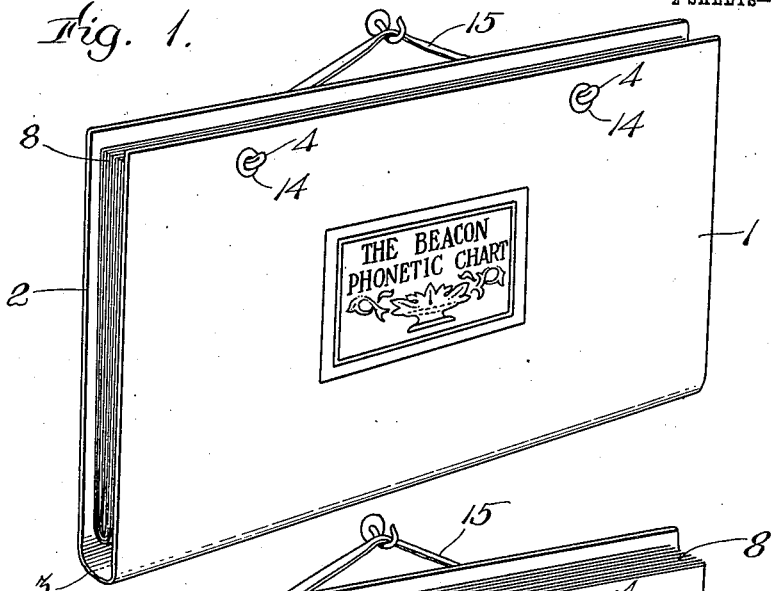
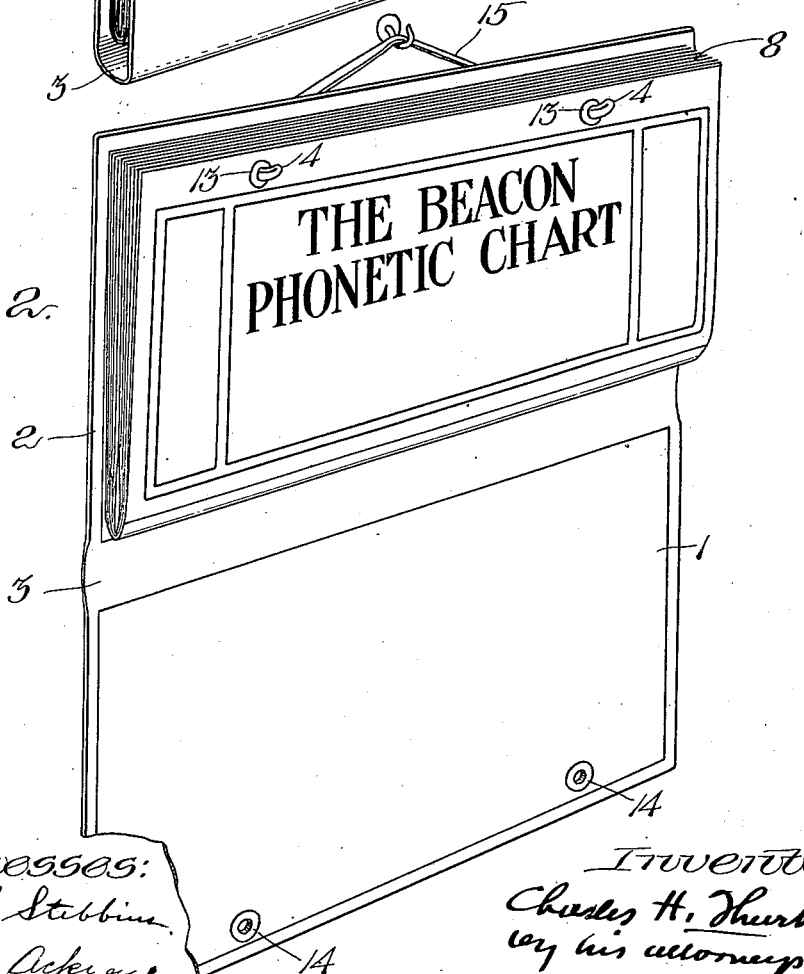

C. H. THURBER.
CHART.
APPLICATION FILED MAY 8, 1913.
1,087,336.
Patented Feb. 17, 1914.
2 SHEETS—SHEET 2.
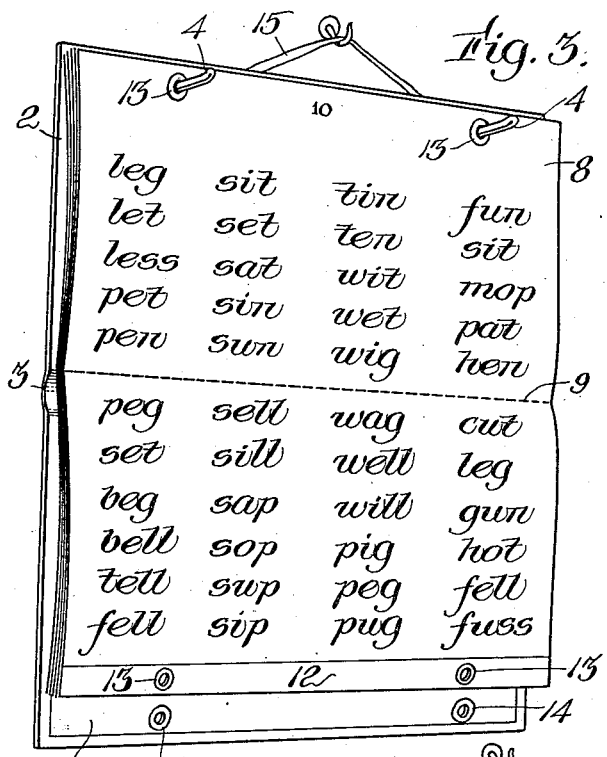
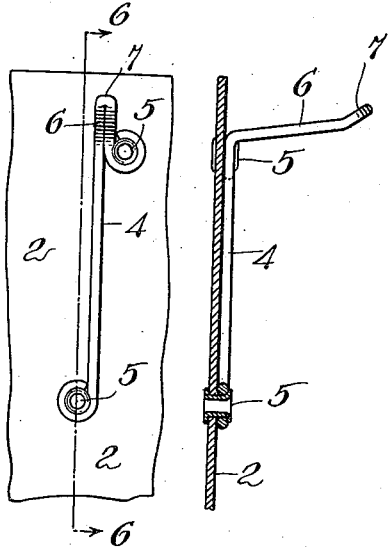
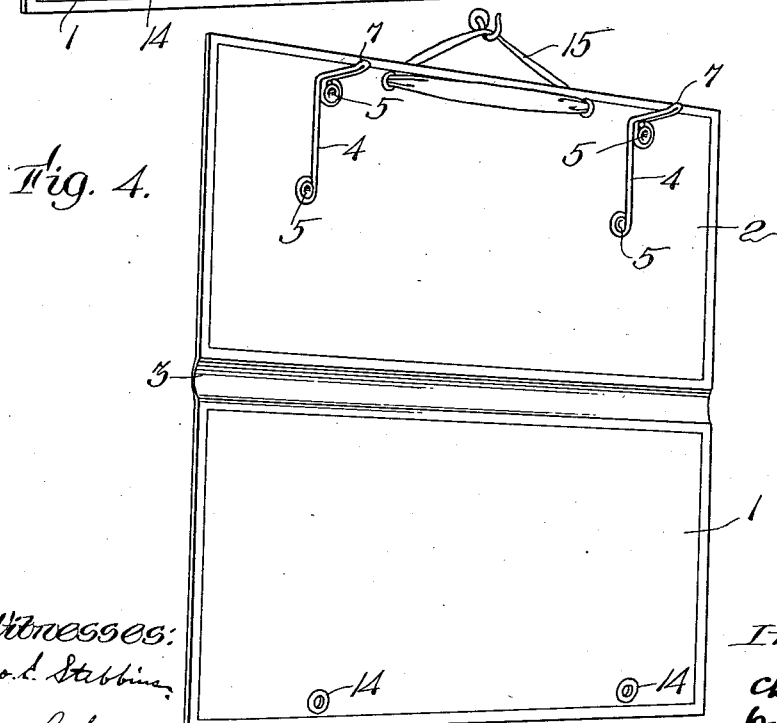

UNITED STATES PATENT OFFICE.

CHARLES H. THURBER, OF FRAMINGHAM, MASSACHUSETTS, ASSIGNOR TO GINN & COMPANY, OF BOSTON, MASSACHUSETTS, A COPARTNERSHIP.

CHART.

1,087,336.  Specification of Letters Patent.  Patented Feb. 17, 1914.

Application filed May 8, 1913. Serial No. 766,310.

*To all whom it may concern:*

Be it known that I, CHARLES H. THURBER, a citizen of the United States, residing at Framingham, in the county of Middlesex and State of Massachusetts, have invented certain new and useful Improvements in Charts; and I do hereby declare the following to be a full, clear, and exact description of the invention, such as will enable others skilled in the art to which it appertains to make and use the same.

The present invention relates to an improvement in charts.

The object of the invention is to improve the construction of charts, in order to produce a chart of a form more durable and convenient in use.

To these ends this invention consists in the improvement in charts hereinafter described and particularly pointed out in the claim.

In the accompanying drawings illustrating the preferred form of the invention, Figure 1 is a perspective view of the chart closed hanging on a hook; Fig. 2 is a perspective view showing the chart with the front cover dropped; Fig. 3 is a perspective view of the chart open in use; Fig. 4 is a similar view of the chart cover or casing with the chart proper removed; and Figs. 5 and 6 illustrate in front and side elevation the chart hooks.

The illustrated embodiment of the invention is described as follows:—The chart consists of a chart proper and a holder or casing therefor. The casing has front and back covers 1 and 2 united by a flexible cloth back strip 3 to form covers for the chart sheets. The back cover 2 of the casing is provided with two chart hooks 4 secured to the back cover by gromets or metallic eyelets 5. Each hook 4 is made of a piece of wire doubled upon itself to form the hook proper 6 which projects forward and slightly upward from the back cover and has at its extreme end a slightly more angularly disposed portion 7 which contributes to retain the chart leaves thereon. The two ends of the wire are bent into circular feet which are engaged by the gromets or eyelets 5 by which the chart hooks are secured to the back cover 2. These two chart hooks 4 are secured to the back, or back cover, 2 of the casing at or near the end of the back cover in such position as to afford a good support for the chart sheets. The front, or front cover, 1 is provided near its margin with gromets or metallic eyelets 14 which fit over the chart hooks when the cover is folded.

The chart proper 8 consists of a number of sheets of paper folded upon themselves and united together at the fold by a seam of stitching 9 to form a number of leaves. The margins of the chart sheets are reinforced with a reinforcing strip 12 of cloth pasted on the edges of the sheets. Secured in the margin of each leaf are two gromets or metallic eyelets 13 spaced apart to correspond to the chart hooks 4.

When the chart is to be used, it is hung on the wall by means of the tape 15 which is attached to the back cover 2 of the casing, in the manner shown in Fig. 4. The chart is held together by the hooks 4 which pass through the gromets or eyelets 13 in all of the leaves and also through the gromets or eyelets 14 in the front cover of the casing. The upward inclination of the chart hooks and the bent-up end portions thereof contribute to hold the front cover 1 from falling off the chart hooks. In opening the chart, the front cover of the casing is unhooked and allowed to fall to the position illustrated in Fig. 2. This exposes the chart sheets or chart proper 8 and then one or more leaves may be removed from the hooks and the chart opened to the position shown in Fig. 3, for example, in which page 10 is exposed and the chart is displayed for use. When this sheet is done with, the next sheet may be unhooked from the chart hooks and allowed to fall, and page 11 will be exposed. The chart, when folded, forms a flat compact package which may be easily carried or stored on shelves or in drawers, the casing keeping the leaves of the chart proper flat and protecting them from soiling and from injury. A number of charts can thus be kept in a comparatively small space.

The chart can be hung upon any kind of a hook, such as a wall hook, dispensing with the stand usually necessary for charts. The leaves of the chart are easily turned; all that is necessary to turn the leaves being to unhook the edge of the leaf from the chart hooks 4 and allow it to fall to expose another face of the chart.

The present invention is not limited to use in connection with instruction charts or maps, but may be used for any other purpose to which it is adaptable.

While the specific form of the invention illustrated in the drawings and described in the foregoing specification is the best form in which the invention has been embodied, it is to be understood that the invention is not limited to this embodiment, as it may be embodied in other forms within the scope of the following claim:—

A chart and a covering therefor, comprising, in combination, a casing having a back and front cover, forwardly and upwardly projecting marginal hooks on the upper edge of the back cover, and marginal holes on the lower edge of the front cover, and chart sheets having holes in their edges by means of which they are supported on the hooks, whereby a chart and covering is provided in which the front cover and one or more of the charts may be suspended in open position, or the charts and the front cover thereover may be turned upward in closed position over the said hooks, for the purpose set forth.

CHARLES H. THURBER.

Witnesses:
MINNIE E. NOYES,
RACHEL RUDE.

Copies of this patent may be obtained for five cents each, by addressing the "Commissioner of Patents, Washington, D. C."